No. 734,549. PATENTED JULY 28, 1903.
H. HALSEY.
ELECTRIC BATTERY.
APPLICATION FILED APR. 13, 1902.
NO MODEL.
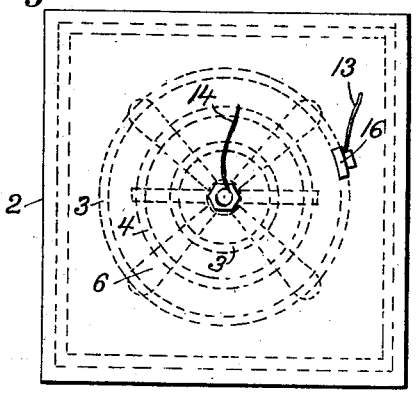
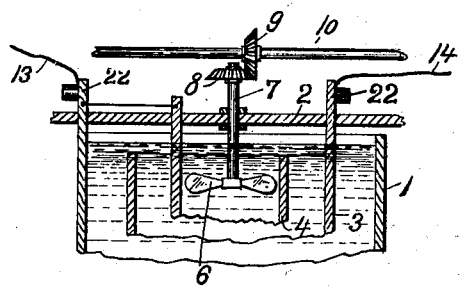
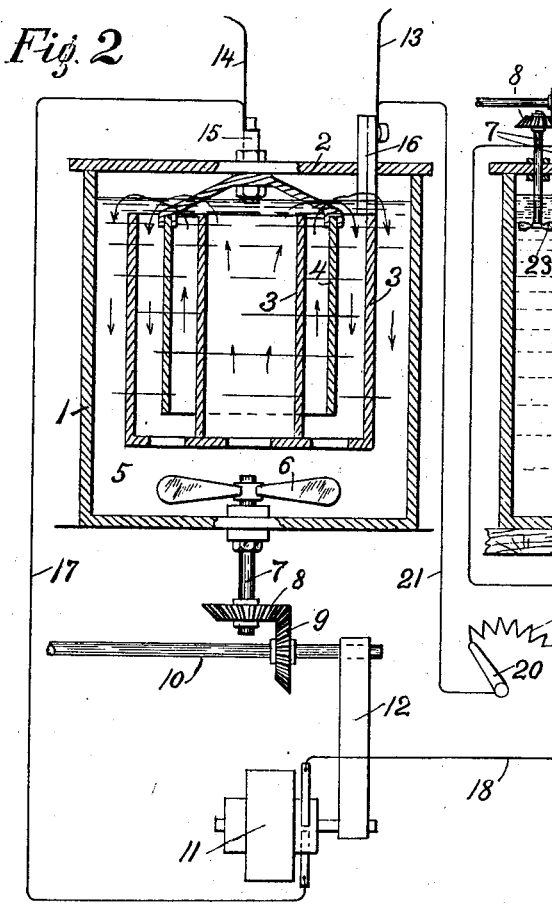
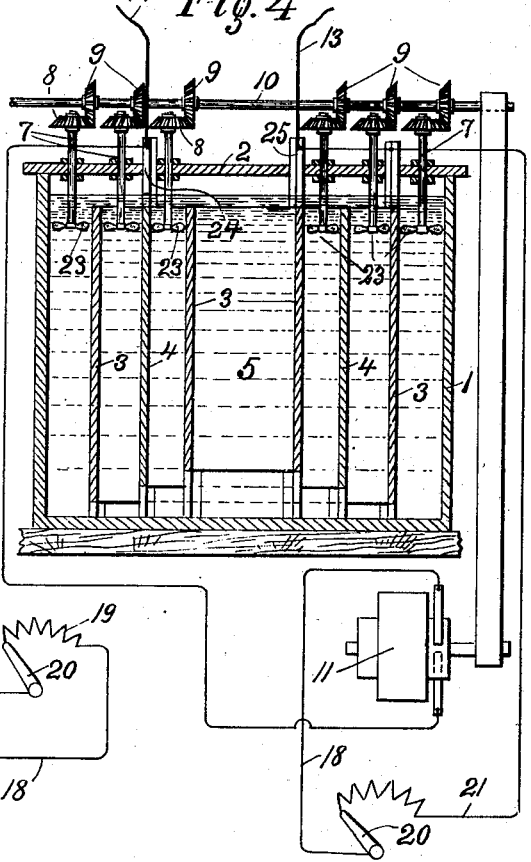
Witnesses
Robert H. Ireland
Lester C. Taylor
Henry Halsey Inventor
By his Attorney C. V. Edwards No. 734,549. Patented July 28, 1903.

UNITED STATES PATENT OFFICE.

HENRY HALSEY, OF NEW YORK, N. Y., ASSIGNOR, BY MESNE ASSIGNMENTS, TO HALSEY ELECTRIC GENERATOR COMPANY, OF JERSEY CITY, NEW JERSEY, A CORPORATION OF NEW JERSEY.

ELECTRIC BATTERY.

SPECIFICATION forming part of Letters Patent No. 734,549, dated July 28, 1903.

Application filed April 18, 1902. Serial No. 103,646. (No model.)

*To all whom it may concern:*

Be it known that I, HENRY HALSEY, a citizen of the United States, residing at New York city, in the county of New York and State of New York, have invented certain new and useful Improvements in Electric Batteries, of which the following is a full, clear, and exact specification.

This invention relates to electric batteries, and especially to that class of batteries wherein movement is maintained between the electrolyte and the elements.

The object of the present invention is to provide simple and efficient means for maintaining such movement, and, further, to provide a construction wherein the parts may be readily assembled and wherein the various parts of the battery are easily accessible.

The invention will be described more fully with reference to the form thereof shown in the accompanying drawings, in which—

Figure 1 is a top view of a battery embodying my invention. Fig. 2 is a sectional view of the same. Fig. 3 is a detailed sectional view showing a modified arrangement of the propeller mechanism, and Fig. 4 is a sectional view showing a further modification.

Referring more particularly to the drawings, 1 represents a suitable case, and 2 the cover therefor.

3 and 4 are the respective battery elements, and 5 is the electrolyte. The battery elements are arranged to provide spaces between each other, which spaces are open to each other at the top and bottom, thereby permitting a continuous flow of the electrolyte around the elements. In the construction shown in Figs. 1 and 2 the elements are all suspended from the cover, the elements being circular in form and concentrically arranged, thereby permitting any desired number of elements to be employed. In the bottom of the cell the propeller 6 is mounted upon a shaft 7, which by suitable gear-wheels or otherwise is connected with shaft 10, the latter shaft being driven by motor 11. The motor 11 in this instance is belted to the shaft 10 by the belt 12.

13 and 14 represent the respective conductors of the external circuit, these conductors being attached to the binding-posts 15 and 16, which are rigidly fixed in the cover and which are connected with the respective elements. The circuit through the motor leads from post 15 by wire 17 to motor 11, thence through wire 18, resistance 19, controller-handle 20, and wire 21 to binding-post 16.

The elements having been fitted to the cover 2, the electrolyte is placed in the case 1. The cover 2 is then placed in position, which immerses the element in the electrolyte. When the motor-circuit is closed by the controller-arm 20, the initial output of the battery starts the motor, thus causing propeller 6 to revolve. The revolution of the propeller establishes a circulation of the electrolyte upward immediately over the propeller, causing the electrolyte to flow, as indicated by the arrows in Fig. 2, up through the central passages between the elements, thence over the ends, and down the sides to the propeller. This movement of the electrolyte brushes the elements and prevents polarization. The speed of the propeller, and consequently the rate of movement of the electrolyte, being maintained constant, the output of the battery will likewise remain constant. Variation in speed of the propeller will, however, be found to effect a consequent variation in speed of the electrolyte.

It will be noted that when the battery-case and its propeller are once mounted in position the cover may be removed without changing any connections. No adjustment is required in placing the cover in position, and each and every part of the battery is readily accessible.

A modified arrangement is shown in Fig. 3, wherein the elements 3 4 rest upon the bottom of the cell and the shaft 7, upon which the propeller 6 is carried, is mounted in the cover 2. Shaft 10, geared to shaft 7 by gears 8 9, may have its bearings 22 22 also mounted upon the cover. With this arrangement removal of the cover removes propeller 7, leaving the elements in the case. The elements, however, may readily be lifted out of the case or placed in position therein. In this instance the flow of the electrolyte will be downward through the central passage and upward through the outside passages between the elements.

In Fig. 4 the elements rest upon the bottom of the case, and in lieu of a single propeller in the central passage one or more small propellers 23 23 are located in the outside passages. With this construction when the propellers are revolved the flow of the liquid will be downward in the outside passages between the electrolyte and upward through the inside passages. The circuit connections may be taken from contact-posts 24 25, carried by the respective elements and projecting through the cover or by passing the conductors over the sides of the casing 1 below the cover, as shown in Fig. 3.

In all of these constructions it will be found that the amount of energy required to revolve the propellers is almost negligible, whereas the revolution and the consequent movement of the electrolyte maintain the output of the battery practically constant. It will be understood that the construction above described may be modified in various respects without departing from the invention, and I therefore do not limit myself to the specific construction shown.

Having thus described my invention, I declare that what I claim as new, and desire to secure by Letters Patent, is—

1. In a battery, the combination with the electrolyte, of a plurality of open-ended concentrically-arranged elements submerged in said electrolyte, a propeller in said electrolyte between the elements, and means for operating the propeller, substantially as described.

2. In a battery, the combination with the electrolyte, of a plurality of elements arranged side by side and wholly submerged in said electrolyte, a propeller in the space between the elements adapted to create a flow of the electrolyte between said elements and around the ends thereof, substantially as described.

3. In a battery, the combination with the electrolyte, of a plurality of tubular elements open at both ends, and an independent propeller or propellers adapted to create a flow of the electrolyte through the elements along the sides thereof, substantially as described.

4. In a battery, the combination with the electrolyte, of a plurality of tubular elements open at both ends, one of said elements being telescoped within the other, and a propeller or propellers adapted to create a flow of electrolyte between the elements and around the ends thereof, substantially as described.

5. In a battery, the combination with the cell containing an electrolyte, of a cover therefor, a plurality of tubular elements suspended therefrom, one of said elements being telescoped within the other, and a propeller or propellers adapted to create a flow of electrolyte through the space between the elements and around the ends thereof, substantially as described.

In testimony whereof I affix my signature in presence of two witnesses.

HENRY HALSEY.

Witnesses:
HENRY BEST,
C. V. EDWARDS.